United States Patent
Valentin et al.

(10) Patent No.: US 8,289,607 B2
(45) Date of Patent: Oct. 16, 2012

(54) ELECTROCHROMIC DEVICE COMPRISING A MESH

(75) Inventors: Emmanuel Valentin, Le Plessis Trevise (FR); Samuel Dubrenat, Paris (FR); Jean-Christophe Giron, Eupen (BE); Didier Jousse, Taverny (FR)

(73) Assignee: Saint-Gobain Glass France, Courbevoie (FR)

( * ) Notice: Subject to any disclaimer, the term of this patent is extended or adjusted under 35 U.S.C. 154(b) by 139 days.

(21) Appl. No.: 12/920,756

(22) PCT Filed: Feb. 24, 2009

(86) PCT No.: PCT/FR2009/050290
§ 371 (c)(1),
(2), (4) Date: Nov. 9, 2010

(87) PCT Pub. No.: WO2009/112751
PCT Pub. Date: Sep. 17, 2009

(65) Prior Publication Data
US 2011/0043887 A1    Feb. 24, 2011

(30) Foreign Application Priority Data
Mar. 4, 2008 (FR) .................................... 08 51399

(51) Int. Cl.
*G02F 1/15* (2006.01)
(52) U.S. Cl. ......... 359/265; 359/266; 359/272; 359/274
(58) Field of Classification Search .......... 359/265–275
See application file for complete search history.

(56) References Cited

U.S. PATENT DOCUMENTS

| 4,874,229 A | * | 10/1989 | Ito et al. ........................ 359/275 |
| 4,932,755 A | | 6/1990 | Holdridge et al. |
| 4,957,352 A | * | 9/1990 | Yasuda et al. ................. 359/275 |
| 5,161,048 A | * | 11/1992 | Rukavina ....................... 359/275 |
| 5,293,546 A | | 3/1994 | Tadros et al. |
| 5,585,958 A | * | 12/1996 | Giraud .......................... 359/265 |
| 5,903,382 A | | 5/1999 | Tench et al. |
| 6,037,005 A | | 3/2000 | Moshrefzadeh et al. |
| 6,072,619 A | * | 6/2000 | Kiryuschev et al. .......... 359/245 |
| 6,198,051 B1 | | 3/2001 | Moshrefzadeh et al. |
| 6,574,028 B2 | * | 6/2003 | Esener et al. ................. 359/254 |
| 6,747,779 B1 | | 6/2004 | Morin et al. |

FOREIGN PATENT DOCUMENTS

| EP | 0 364 247 | 4/1990 |
| EP | 0 618 477 | 10/1994 |
| WO | 00 57243 | 9/2000 |

OTHER PUBLICATIONS

U.S. Appl. No. 12/922,341, filed Sep. 13, 2010, Lamine, et al.
U.S. Appl. No. 12/922,351, filed Oct. 15, 2010, Lamine, et al.

* cited by examiner

*Primary Examiner* — Evelyn A. Lester
(74) *Attorney, Agent, or Firm* — Oblon, Spivak, McClelland, Maier & Neustadt, L.L.P.

(57) ABSTRACT

An electrochromic device, with controlled transparency, for example of electrically controllable type, including between a transparent carrier substrate and a counter-substrate, at least one stack of functional layers, the outermost layers of which include electroconductive layers, the conductivity of at least one electroconductive layer not in contact with the carrier substrate being reinforced by a network of conductive elements in contact with this layer. The network includes a mesh, for which the area of the intermesh free space is substantially between 0.04 mm$^2$ and 0.16 mm$^2$ or in a vicinity of 0.09 mm$^2$.

17 Claims, 2 Drawing Sheets

ELECTROCHROMIC DEVICE COMPRISING A MESH

CROSS-REFERENCE TO PRIORITY APPLICATIONS

The present application is the U.S. counterpart of WO 2009/112751, and claims priority to French application no. 0851399 filed Mar. 4, 2008, the entire contents of each of which are hereby incorporated herein by reference.

The present invention relates to an electrochromic device with controlled transparency, especially intended to constitute an electrically controllable glazing unit.

Glazing units are known that have a light transmission capacity that can be adjusted from a good level of transparency to the most complete opacity. Such glazing units have found applications in the most diverse technical fields.

It is thus possible to use them as glazing units for a dwelling in order, for example, to adjust the degree of sunshine in a place as a function of the outside conditions and desires of the users. It is also possible to use them as isolating shutters to preserve the privacy of the inhabitants of a place either with respect to the outside, or with respect to adjoining rooms.

It is also possible, in the automotive field, to make use of such devices for, for example, controlling the level of transparency of the windscreen and/or of the side windows or of the sunroof of a car, and also on certain accessories of the latter, such as the rearview mirrors, in order to control the flux of light reflected toward the driver and to avoid dazzling the driver. It is of course possible to use them in other fields such as, in particular, the aeronautic field for controlling, for example, the transparency of aircraft windows.

It is known that the electrochromic devices comprise a layer of an electrochromic material capable of reversibly and simultaneously inserting ions and electrons, the oxidation states of which, corresponding to the inserted and extracted states, have different colors when they are subjected to an appropriate power supply; one of these states having a higher light transmission than the other. The electrochromic material is generally based on tungsten oxide and must be brought into contact with a source of electrons, such as for example a transparent electroconductive layer, and with a source of ions (cations or anions) such as an ionically-conductive electrolyte. It is known that a counter-electrode, also capable of reversibly inserting cations, must be combined with the layer of electrochromic material, symmetrically with respect to the latter, so that, macroscopically, the electrolyte appears to be a single ion medium. The counter-electrode must be composed of a layer that is neutral in coloration or, at least, transparent or not very colored when the electrochromic layer is in the colored state.

Since tungsten oxide is a cathodic electrochromic material, that is to say that its colored state corresponds to the most reduced state, an anodic electrochromic material based on nickel or iridium oxide is generally used for the counter-electrode. It has also been proposed to use an optically neutral material in the oxidation states in question, such as for example cerium oxide or organic materials such as electronically conductive polymers (polyaniline) or Prussian blue.

The electrochromic systems can currently be ranked in two categories depending on the electrolyte used.

In the first category, the electrolyte may thus be in the form of a polymer or of a gel, such as for example, a proton-conducting polymer, such as those described in European Patents EP 0 253 713, and EP 0 670 346 or a lithium ion-conducting polymer such as those described in Patents EP 0 382 623, EP 0 518 754 or EP 0 532 408.

In the second category, the electrolyte may also be composed of a mineral layer forming an ionic conductor which is electrically insulated. These electrochromic systems are then designated as being "all solid". Reference can be made to European Patents EP 0 867 752 and EP 0 831 360.

Other types of electrochromic systems are known, such as, in particular, the electrochromic systems known as "all polymer" electrochromic systems, in which two electroconductive layers are positioned on both sides of a stack comprising a polymer having cathodic coloration, an ionically-conductive ($H^+$ or $Li^+$ ions most particularly) and electronically-insulating polymer and finally a polymer having anodic coloration (such as polyaniline or polypyrrole).

Finally systems are known that are said to be "active" in the sense of the invention which combine viologen materials and electrochromic materials for example having the sequence: conductive electrode/mineral layer or polymer layer having electrochromic properties/(liquid, gel, polymer) layers having viologen properties/conductive electrode.

These systems having reversible insertion materials are particularly advantageous in that they make it possible to adjust the absorption in a wider range of wavelengths than the viologen systems: they can absorb, in a varying manner, not only in the visible range but also, in particular, in the infrared range, which may give them an effective optical and/or thermal role.

These various systems comprise two electroconductive layers that surround one or more electrochemically active layers. When a potential difference is applied between these two electroconductive layers, the transmission/absorption state of the system, otherwise known as the level of transparency of the system, is controlled by the value of this potential difference.

When the system forms a glazing unit that is desired to be "electrically controllable", transparency is of course favored for these electroconductive layers, so much so that they must be made from materials that are both conductors of electric current and transparent, and this in ranges of thickness that are customarily encountered in the field of thin films.

Usually use is made of a doped metallic oxide material such as fluorine-doped tin oxide ($SnO_2$: F) or tin-doped indium oxide (ITO) that it is possible to deposit onto various substrates at high temperature, especially by pyrolysis onto glass, such as the CVD technique, or at low temperature, especially by vacuum sputtering techniques.

It has however been observed that in the thicknesses where they remain transparent, the layers based on these materials do not give complete satisfaction insofar as they are not good enough conductors of electric current, so that when the appropriate voltage for causing the change of state modification necessary for modifying their transparency is applied between their terminals, they increase the response time of the system, or the switching time.

More specifically, in the case for example, where the two electroconductive layers are composed of tin-doped indium oxide (ITO), the resistivity of the base layer, or lower layer, which is around 3 to 5Ω/□ increases to 60-70Ω/□ for the upper layer due to its smaller thickness. This is because it is known that if the base layer has a thickness of around 500 nm, the upper layer itself only has a thickness of around 100 nm, for reasons mainly linked to the mechanical stress generated in the stack.

More generally, oxide-based transparent conductive electrodes, such as those made of ITO, although they are conductive do not attain levels of electronic conductivity comparable to those obtained with metallic materials, even by increasing the thickness of the layer. It will be remarked that for the specific case of ITO, its material cost being what it is today, that on the contrary it will be sought to minimize the thickness of the layer deposited. This difference in resistivity between the lower and upper layers is the source of the slow down of the switching time of the device, that is to say of the time needed for the system to change from its most transparent state to its most opaque state. Such a slow down furthermore contributes to the formation of a "halo" phenomenon, that is to say to the fact that, at the periphery of the system, namely in the areas close to the incoming current cables, the shift in transparency is almost immediate whereas at the center it occurs gradually.

It is understood that, in most of the applications and especially in the sector of glazing units for housing and in that of the automotive industry, such faults are very difficult for the user to accept, the user desiring a change that is as rapid and as uniform as possible.

To overcome such a drawback, it was proposed in Application WO 00/57243, to increase the electrical conductivity of the upper conductive layer by attaching to the latter a network of conductive wires separated from each other by a distance of around 1 to 3 mm.

For technical support reasons, these networks of wires are positioned on a interlayer support sheet based on a thermoplastic polymer, and especially a polyurethane sheet, which is laminated in contact with the upper electroconductive layer. The resistivity of the latter is thus brought to values of around $0.05\Omega/\square$ to $0.5\Omega/\square$ and by doing this the switching time of the system and also the halo phenomenon mentioned previously are reduced.

It has however been observed that such a system has several drawbacks.

Firstly, when the system is in its state of greatest transparency, the wires are visible to the naked eye, so much so that, under certain lighting conditions, they may induce undesired reflections.

Secondly, when the system is exposed to high temperatures, which is sometimes the case when it is installed in automobiles that are in full sun, the conductive wires have a tendency to sink into the interlayer so that they then lose contact with the electroconductive layer, and from that moment they no longer carry out their function.

Finally, the high level of surface quality of the wires which is necessary to prevent them damaging the electroconductive layer with which they are in contact introduces an additional parameter which is difficult to control technically, which involves a manufacturing cost premium.

The objective of the present invention is to overcome these various drawbacks by providing a device that makes it possible both to make the elements that make it possible to increase the conductivity of the electroconductive layer invisible to the eye, to prevent these elements from losing contact with said layer when the system is subjected to high temperatures, and to avoid damaging the electroconductive layer, and this without however imposing high quality levels on said elements.

One subject of the present invention is thus an electrochromic device, with controlled transparency, in particular of the electrically controllable type, comprising between a transparent carrier substrate and a counter-substrate, at least one stack of functional layers, the outermost layers of which comprise electroconductive layers, the conductivity of at least one electroconductive layer not in contact with the carrier substrate being reinforced by a network of conductive elements in contact with this layer, characterized in that the network comprises a mesh, for which the area of the intermesh free space is substantially between $0.04 \text{ mm}^2$ and $0.16 \text{ mm}^2$ and preferably in the vicinity of $0.09 \text{ mm}^2$.

So as to preserve the mesh, especially during its positioning, it will preferably be held by a support, in particular made of a polymer material.

In one embodiment of the invention said stack of functional layers successively comprises, going from the carrier substrate toward the counter-substrate, an electroconductive layer, a first layer of an electrochromic material, at least one layer having an electrolytic function, a second layer of an electrochromic material and an electroconductive layer having a reduced thickness.

In another embodiment of the invention the device comprises two stacks of functional layers, separated by a lamination interlayer equipped on each of its faces with a mesh, in particular angularly offset from one another by an angle between 15 to 60°, preferably between 30 to 50°, to prevent moiré patterns, namely a first stack of the same type as that of the preceding embodiment, which receives a second stack of functional layers for which the arrangement of the layers is reversed relative to the first stack and which successively comprises an electroconductive layer having reduced thickness, an electrochromic material, at least one layer having an electrolytic function, a layer of an electrochromic material and an electroconductive layer.

The mesh will preferably comprise wires, in particular woven wires, that are conductive at least over their outer surface, and the diameter of which is between 10 and 30 μm and preferably in the vicinity of 20 μm.

The wires could comprise a core made of a material that gives them a flexural elasticity, especially formed from a polymer, preferably a polyester.

This core could be covered with a material that conducts electric current, and especially with copper. So as to help to mask the mesh from the eyes of the user, the outer surface of the wires forming the latter will comprise a black-colored conductive oxide.

In most cases, the wires forming the mesh will be positioned so that the intermesh free space is of square or rectangular shape. However, especially in order to prevent diffraction phenomena, it will be possible to distribute the wires forming the mesh in a wavy shape, along two preferably secant and in particular perpendicular directions. More specifically, the wavy shape could be composed of a succession of quarter circles, the respective directions of curvature of two successive arcs being opposite. Preferably the points of intersection of the wires will be located at the points of inflection of two successive arcs.

Preferably, the transparency of the mesh will be between 70 and 90%, and will preferably be around 80%.

The present invention makes it possible, especially when the core forming the wire from which the mesh is constituted is made from a polymer type material, to give the device a flexibility that enables it to easily adopt a curve and to protect the stack from scratches and perforations, without creating folds by forming a uniform curve. It is thus possible, according to the invention, to laminate the mesh in curved and uniform glazing units of large sizes, of around several $m^2$, this being a consequence of the elongation coefficient of the material forming the core of the wire which is between 20 and 25%.

According to another aspect of the invention, it targets an electrochromic glazing unit, which comprises the electrochemical device as described previously, having in particular a variable light and/or energy transmission and/or reflection, with the substrate or at least one part of the substrates which is (are) transparent or partially transparent, made of a plastic material, preferably mounted as multiple and/or laminated glazing, or as double glazing.

According to yet another aspect of the invention, it targets the use of the preceding glazing unit as architectural glazing, automotive glazing, windows for industrial or public transport, rail, sea, air, agricultural or work site vehicles, rearview mirrors, mirrors, displays and screens, or shutters for image acquisition devices.

One embodiment of the present invention will be described below, by way of non-limiting example, with reference to the appended drawing in which.

Figure 1:
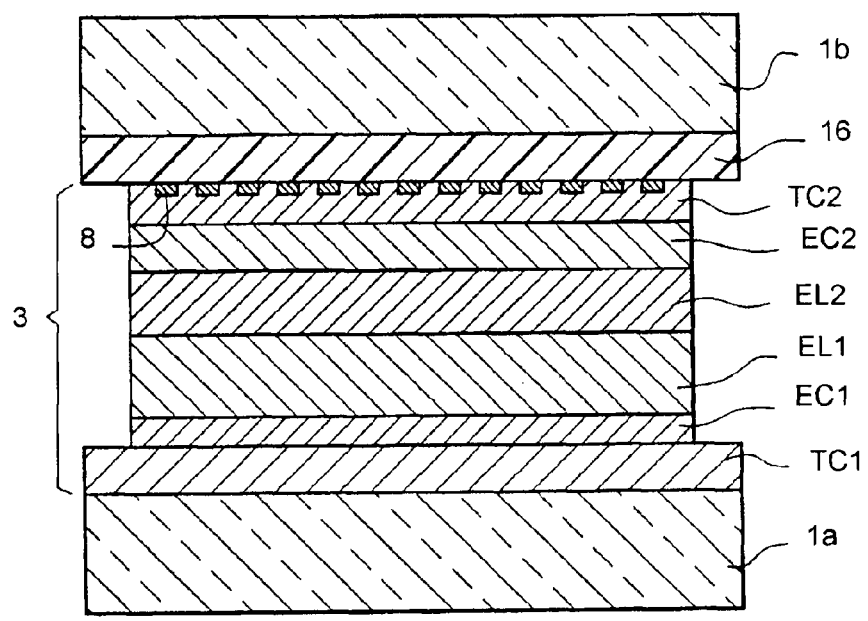
FIG. 1 is a schematic sectional view of an electrochromic device according to the invention.

Represented in FIG. 1 is an electrochromic device with controlled transparency according to the invention which is especially intended to be applied to the production of a glazing unit for an automobile, for which it is desired to be able to adjust the transparency and control the curvature.

Generally, such a device is formed from a stack of functional layers known as an "all solid" stack, the structure of which is composed of an electrochromic functional system of the type EC1/EL1/EL2/EC2 positioned between two electroconductive layers TC1 and TC2, this stack of functional layers being positioned between a carrier substrate 1a and a counter-substrate 1b. In such a device:

the two outermost layers TC1 and TC2 of this stack are electroconductive layers of metallic type or of TCO (transparent conductive oxide) type made of $In_2O_3$:Sn (ITO), $SnO_2$:F, ZnO:Al. They may also be a multilayer of the TCO/metal/TCO type, this metal being chosen in particular from silver, gold, platinum, copper or a multilayer of the NiCr/metal/NiCr type, the metal being chosen, in particular, from silver, gold, platinum or copper;

the two layers EC1 and EC2 are electroactive electrochromic layers that comprise at least one of the following compounds used alone or as a mixture: oxides of tungsten, of niobium, of tin, of bismuth, of vanadium, of nickel, of iridium, of antimony or of tantalum, and/or an additional metal such as titanium, rhenium or cobalt;

the layer EL is a layer having an electrolytic function, which may in fact be formed from the combination of at least one layer based on a material chosen from the oxides of tantalum, of tungsten, of molybdenum, of antimony, of niobium, of chromium, of cobalt, of titanium, of tin, of nickel, of zinc optionally alloyed with aluminum, of zirconium, of aluminum, or of silicon optionally alloyed with aluminum, silicon nitride optionally alloyed with aluminum or boron, boron nitride, aluminum nitride, vanadium oxide optionally alloyed with aluminum, zinc tin oxide, at least one of these oxides being optionally hydrogenated or nitrided. In the example illustrated in FIG. 1, the layer EL comprises two layers having electrolytic functions (EL1 and EL2).

In the present embodiment of the invention, the stack 3 of functional layers of the "all solid" type positioned between the glass carrier substrate 1a and the counter-substrate 1b comprises:

a first electroconductive layer TC1 composed of a fluorine-doped tin oxide ($SnO_2$:F) having a thickness of around 500 nm;

a first layer EC1 of an anodic electrochromic material made of hydrated iridium oxide $IrO_xH_y$, having a thickness of 70 nm;

a first layer having an electrolytic function EL1 of tungsten oxide $WO_3$ having a thickness of 100 nm;

a second layer having an electrolytic function $EL_2$ of hydrated tantalum having a thickness of 250 nm; and a second layer EC2 of a cathodic electrochromic material based on tungsten oxide $H_xWO_3$, having a thickness of 380 nm;

a second electroconductive layer TC2 also composed of fluorine-doped tin oxide ($SnO_2$:F). Its thickness, for the reasons mentioned previously, is smaller than that of the first layer, namely around 120 nm.

According to the invention, the conductivity of the second electroconductive layer TC2 of smaller thickness (and which is not in contact with the carrier substrate 1a) is reinforced by a conductive mesh 6 which comprises any conductive metal and especially copper or tungsten.

Figures 2, 3:
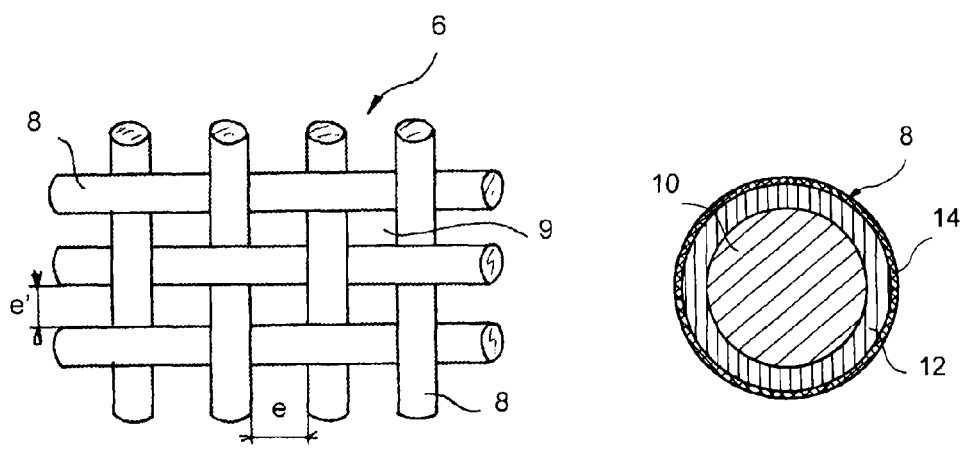
FIG. 2 is a detailed view of an example of a mesh used in the device according to the invention.
FIG. 3 is a cross-sectional view of an example of a wire used in the mesh used in the device according to the invention.

According to the invention, the mesh will preferably be composed of conductive wires 8 woven together, as shown in FIG. 2. The diameter of these wires 8 will be between around 10 and 30 μm and preferably around 20 μm. The gaps e and e' between the wires 8 will be between 200 μm and 400 μm and preferably in the vicinity of 300 μm so that the space 9, or area of the intermesh free space, will be between 0.04 and 0.16 $mm^2$ and will preferably be around 0.09 $mm^2$.

Given in the table below are, for one and the same value of the diameter of the wire constituting several meshes, are the LT and haze values obtained.

| Diameter of the wire | Wires/$inch^2$ | Opening (%) | V/interlayer/mesh/V | LT (%) | Haze (%) |
| --- | --- | --- | --- | --- | --- |
| | | | No mesh | 89.8 | 0.17 |
| 29 μm | 132 × 127 | 73 | mesh A | 63.2 | 1.3 |
| 29 μm | 95 × 95 | 79.5 | mesh B | 69 | 1.07 |
| 29 μm | 132 × 132 | 72 | mesh C | 64.5 | 2.48 |

As can be seen, it is preferable to reduce the density of the wires per $inch^2$ (mesh B) in order to increase the opening (wire area/total area ratio) and therefore in the end to increase the light transmission value and thus reduce the haze value.

In one particularly advantageous variant of the invention, the wires 8 constituting the mesh 6 as represented in FIG. 3 could be composed of a core 10 made of a polymer material, and especially made of polyester, covered with a conductive material 12, such as, in particular, copper, optionally itself covered with a black-colored conductive metal oxide 14.

This mesh 6 is preferably deposited on a lamination interlayer 16, for example made of polyurethane or of PVB (polyvinylbutyral), and the latter is laminated in contact with the second electroconductive layer TC2.

According to one embodiment variant, it will be possible to cover the electrode TC1, before depositing the stack 3 of functional layers, with a metallic fabric, such as that described in the application belonging to the Applicant company filed under the number PCT/FR2007/051722.

Nevertheless, in this case, it will be advantageous to provide an angular offsetting of the links forming this fabric, by an angle between 15 and 60°, preferably between 30 and 50°, between the mesh 6 and this metallic fabric, to avoid moiré patterns.

According to the present invention, the stack 3 of functional layers may of course have various configurations, depending on the result that the device is intended to provide.

Figure 4:
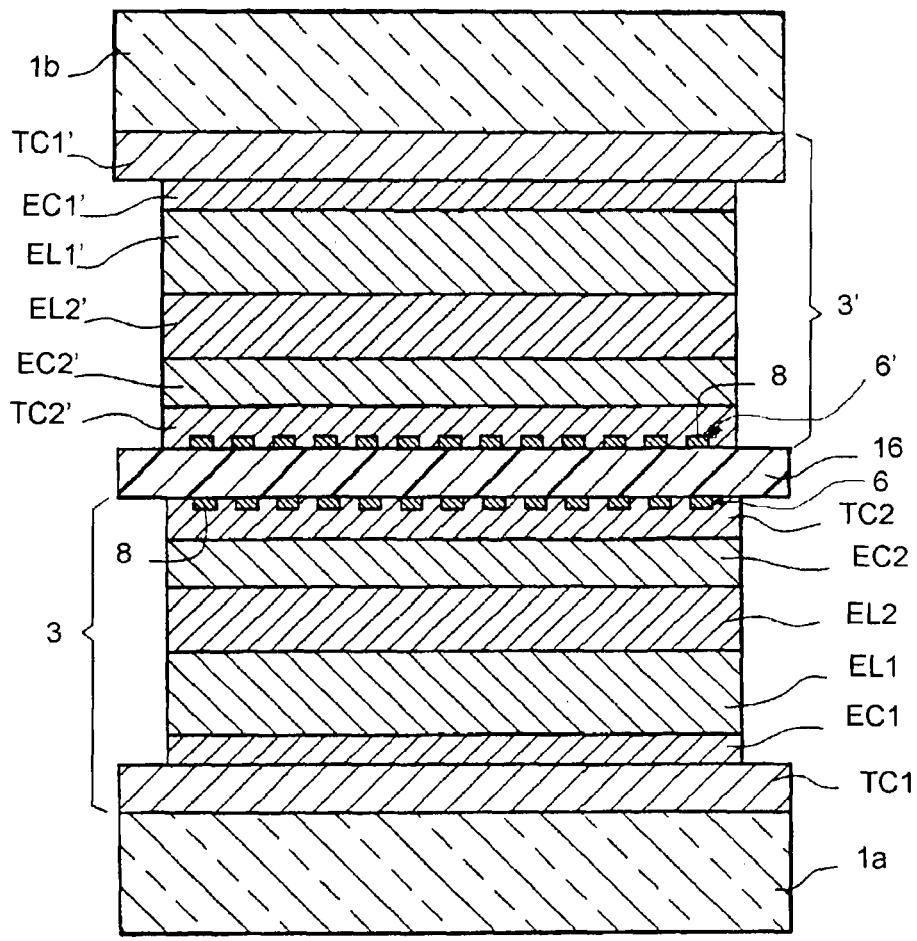
FIG. 4 is a schematic sectional view of a second exemplary embodiment of an electrochromic device according to the invention.

Thus, when it is desired to strengthen the opacity conferred by the device, especially to occlude significant luminous intensities, it is possible to give it the configuration represented in FIG. 4.

In this figure, the electrochromic device thus comprises a carrier substrate 1a and a counter-substrate 1b arranged between which are two stacks of functional layers 3 and 3'.

The first stack 3 of functional layers is of the same type as that described previously and thus comprises, an electroconductive layer TC1, a first layer EC1 of an anodic electrochromic material, two layers having an electrolytic function EL1 and EL2, a second layer EC2 of a cathodic electrochromic material, and an electroconductive layer TC2 of smaller thickness than the layer TC1. According to the invention, the electroconductive layer TC2 of smaller thickness receives a conductive mesh 6 supported by an interlayer 16.

The second stack 3' of functional layers is positioned on the first and the arrangement of its layers is reversed relative to the first stack. It thus comprises a conductive mesh 6' also supported by the interlayer 16, an electroconductive layer TC2' of smaller thickness, a layer EC2 of a cathodic electrochromic material, two layers having electrolytic function EL1' and EL2', a layer EC1' of an anodic electrochromic material, and an electroconductive layer TC1'.

Figure 5:
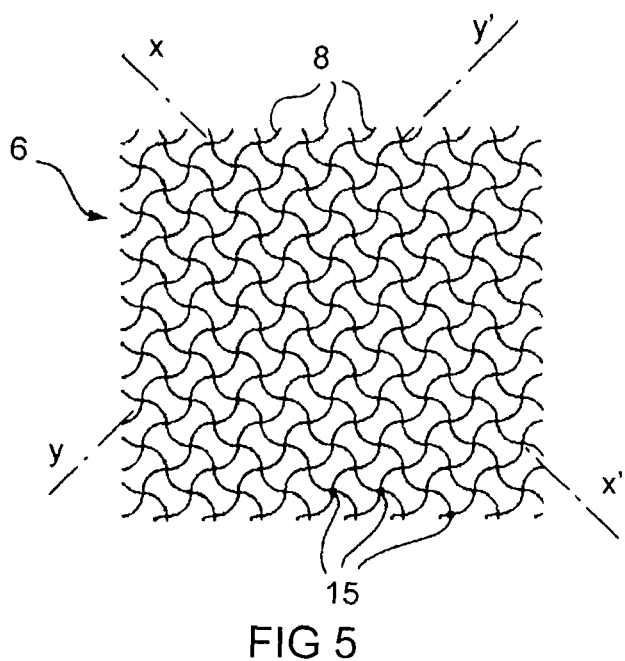
FIG. 5 is a second example of a mesh used in the device according to the invention.

The mesh, in order to prevent diffraction phenomena, may be composed of wires 8 that form a wave, as represented in FIG. 5, and that are distributed along two preferred directions xx' and yy' which are secant. In the present exemplary embodiment these two preferred directions are perpendicular.

The waves could advantageously be composed of a succession of fractions of circles, especially quarter circles, so that two successive circle fractions have their concavity oriented oppositely.

Preferably, the points of intersection 15 of these wires will be located at the points of inflection of two successive arcs.

A certain number of improvements have been observed for such an electrochromic device compared to that from the prior art in which the conductivity of the electroconductive layer of smaller thickness was already improved by a network of conductive wires.

It has thus firstly been observed that the resistivity of the latter layer was brought from a value of 60 to 70Ω/□ a value between 0.05Ω/□ and 0.5Ω/□.

It has furthermore been noticed, for an observer located at a distance of around one meter from the device, that the mesh 6 was almost invisible to the naked eye and no longer generated undesired reflections, even in the cases of reputedly difficult lighting.

It has also been observed that the loss of contact of the mesh 6 with the electroconductive layer when the device was exposed to temperatures of around 80 to 90° C. was so low that, at the end of 2000 hours, no increase in the switching time was detected, whereas, in the prior art, this switching time was able to increase in a ratio of 5 to 10.

Furthermore, the elasticity conferred by the core 10 of the wires 8 forming the mesh 6 makes it possible, on the one hand, to avoid the bends that are sure to be formed when the wires are made from a non-elastic material, such as, for example, copper and, on the other hand, to give a uniform and pronounced contour to the assembly, which makes it possible to produce laminated glazing units of large size and having a low radius of curvature, without however causing deteriorations of the lamination interlayer 16 and of its mesh.

It has finally been observed that the conductive mesh made it possible to make up glazing units forming electrostatic shielding, which proves particularly advantageous for applications in certain fields where it is essential to form a barrier to this type of radiation, such as the aeronautical field, for example for forming aircraft windows.

The invention claimed is:

1. An electrochromic device, with controlled transparency, or of electrically controllable type, comprising:
   between a transparent carrier substrate and a counter-substrate, at least one stack of functional layers, outermost layers of which comprise electroconductive layers, conductivity of at least one electroconductive layer not in contact with the carrier substrate being reinforced by a network of conductive elements in contact with this layer,
   wherein the network comprises a mesh, for which an area of intermesh free space is substantially between 0.04 mm$^2$ and 0.16 mm$^2$, or in a vicinity of 0.09 mm$^2$.

2. The electrochromic device with controlled transparency as claimed in claim 1, wherein the mesh is held by a support, or by a support made of a polymer material.

3. The electrochromic device with controlled transparency as claimed in claim 1, wherein the stack of functional layers is successively composed, from the carrier substrate toward the counter-substrate, of an electroconductive layer, of a first layer of an electrochromic material, of at least one layer having an electrolytic function, of a second layer of an electrochromic material, and of an electroconductive layer having a reduced thickness.

4. The electrochromic device with controlled transparency as claimed in claim 3, wherein the electroconductive conductive layer is covered with a metallic fabric, links forming the fabric being offset angularly by an angle between 15 to 60°, or between 30 to 50°, relative to the mesh.

5. The electrochromic device with controlled transparency as claimed in claim 3, wherein the stack of functional layers receives a second stack of functional layers for which an arrangement of the layers is reversed relative to the first stack and which is successively composed of an electroconductive layer having reduced thickness, of an electrochromic layer, of at least one layer having an electrolytic function of a layer of an electrochromic material, and of an electroconductive layer.

6. The electrochromic device with controlled transparency as claimed in claim 1, wherein the mesh comprises wires that are conductive at least over their outer surface, and the diameter of which are between 10 and 30 μm, or in a vicinity of 20 μm.

7. The electrochromic device with controlled transparency as claimed in claim 6, wherein the wires comprise a core made of a material that gives them a flexural elasticity, or formed from a polymer, or from a polyester.

8. The electrochromic device with controlled transparency as claimed in claim 7, wherein the core is covered with a material that conducts electric current, or with copper.

9. The electrochromic device with controlled transparency as claimed in claim 6, wherein the outer surface of the wires is based on a black-colored conductive oxide.

10. The electrochromic device with controlled transparency as claimed in claim 6, wherein the wires forming the mesh are positioned so that their intermesh free space is of square or rectangular shape.

11. The electrochromic device with controlled transparency as claimed in claim 6, wherein the wires are distributed, in a wavy shape, or along two secant directions.

12. The electrochromic device with controlled transparency as claimed in claim 11, wherein the two directions are perpendicular.

13. The electrochromic device with controlled transparency as claimed in claim 11, wherein the wavy shape comprises a succession of quarter circles, the respective directions of curvature of two successive arcs being opposite.

14. The electrochromic device with controlled transparency as claimed in claim 11, wherein points of intersection of the wires are located at points of inflection of two successive arcs.

15. The electrochromic device with controlled transparency as claimed in claim 1, wherein the transparency of the mesh is between 70 and 90%, or is around 80%.

16. An electrochromic glazing unit, comprising:

the electrochemical device as claimed in claim 1, including a variable light and/or energy transmission and/or reflection, with the substrate or at least one part of the substrates which is transparent or partially transparent, made of a plastic material, or mounted as multiple and/or laminated glazing, or as double glazing.

17. The use of the glazing unit as claimed in claim 16, as an architectural glazing, automotive glazing, windows for industrial or public transport, rail, sea, air, agricultural or work site vehicles, rearview mirrors, mirrors, displays and screens, or shutters for image acquisition devices.

* * * * *